United States Patent
Knych et al.

(10) Patent No.: US 9,223,683 B1
(45) Date of Patent: Dec. 29, 2015

(54) TOOL TO ANALYZE DEPENDENCY INJECTION OBJECT GRAPHS FOR COMMON ERROR PATTERNS

(75) Inventors: Thomas William Knych, San Francisco, CA (US); David Ross, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 124 days.

(21) Appl. No.: 13/463,633

(22) Filed: May 3, 2012

(51) Int. Cl.
G06F 9/44 (2006.01)
G06F 11/36 (2006.01)

(52) U.S. Cl.
CPC ........ G06F 11/3684 (2013.01); G06F 11/3672 (2013.01); G06F 11/3692 (2013.01)

(58) Field of Classification Search
CPC ............ G06F 11/3684; G06F 11/3672; G06F 11/3692; G06F 11/3696; G06F 11/3604
USPC .......................................... 717/124–126, 144
See application file for complete search history.

(56) References Cited

U.S. PATENT DOCUMENTS

| | | | | |
|---|---|---|---|---|
| 5,615,333 | A * | 3/1997 | Juettner et al. | 714/38.13 |
| 5,673,387 | A * | 9/1997 | Chen et al. | 714/38.1 |
| 6,549,944 | B1 * | 4/2003 | Weinberg et al. | 709/224 |
| 7,539,977 | B1 * | 5/2009 | Bloom | 717/124 |
| 8,037,453 | B1 * | 10/2011 | Zawadzki | 717/123 |
| 8,276,123 | B1 * | 9/2012 | Deng et al. | 717/125 |
| 8,578,336 | B1 * | 11/2013 | Wiradarma et al. | 717/125 |
| 8,607,203 | B1 * | 12/2013 | Mehra | 717/131 |
| 2003/0014734 | A1 * | 1/2003 | Hartman et al. | 717/125 |
| 2005/0125776 | A1 * | 6/2005 | Kothari et al. | 717/131 |
| 2006/0101308 | A1 * | 5/2006 | Agarwal et al. | 714/25 |
| 2006/0190771 | A1 * | 8/2006 | Hefner | 714/38 |
| 2007/0094542 | A1 * | 4/2007 | Bartucca et al. | 714/38 |
| 2007/0150869 | A1 * | 6/2007 | Tateishi et al. | 717/127 |
| 2007/0198970 | A1 * | 8/2007 | Horii et al. | 717/124 |
| 2008/0307264 | A1 * | 12/2008 | de Halleux et al. | 714/38 |
| 2009/0006452 | A1 * | 1/2009 | Grechanik | 707/102 |

(Continued)

OTHER PUBLICATIONS

Anjaneyulu Pasala et. al., "Selection of Regression Test Suite to Validate Software Applications upon Deployment of Upgrades," Proc. 19th Australian Conference on Software Engineering on IEEE, 2008, pp. 130-138.*

(Continued)

*Primary Examiner* — Van Nguyen
*Assistant Examiner* — Jacob Dascomb
(74) *Attorney, Agent, or Firm* — Birch, Stewart, Kolasch & Birch, LLP

(57) ABSTRACT

The present document pertains to systems and methods of dependency framework analysis to automatically identify errors in the dependency framework of an application or software module. Variations discussed include devices and methods for identifying errors in an object dependency graph by techniques such as determining a module and module type associated with a method at a plugin point on the object dependency graph; automatically selecting, from a set of testlets, at least one testlet associated with the determined module type, where each testlet is associated with one or more common dependency errors; and automatically creating, with a processor, at least one test suite for each selected testlet, where automatically creating includes building an executable code module that, when executed with a processor, analyzes the dependency graph at the plugin point and generates data showing a location and severity of common dependency errors within the graph.

18 Claims, 5 Drawing Sheets

(56) References Cited

U.S. PATENT DOCUMENTS

| | | | |
|---|---|---|---|
| 2009/0217248 A1* | 8/2009 | Bently et al. | 717/132 |
| 2009/0300641 A1* | 12/2009 | Friedman et al. | 718/104 |
| 2010/0070231 A1* | 3/2010 | Hanumant | 702/123 |
| 2010/0161574 A1* | 6/2010 | Davidson et al. | 707/705 |
| 2010/0198799 A1* | 8/2010 | Krishnan et al. | 707/702 |
| 2010/0229150 A1* | 9/2010 | Stone et al. | 717/104 |
| 2011/0107297 A1* | 5/2011 | Chandra et al. | 717/110 |
| 2012/0174068 A1* | 7/2012 | Gutfleisch et al. | 717/124 |
| 2012/0222014 A1* | 8/2012 | Peretz et al. | 717/125 |
| 2012/0259576 A1* | 10/2012 | Thulasidasan et al. | 702/123 |

OTHER PUBLICATIONS

Mary Jean Harrold, John D. McGregor, and Kevin J. Fitzpatrick. "Incremental Testing of Object-Oriented Class Structures". Proceedings of the 14th International Conference on Software Engineering. pp. 68-80. May 11-15, 1992. Melbourne, Australia.*

* cited by examiner

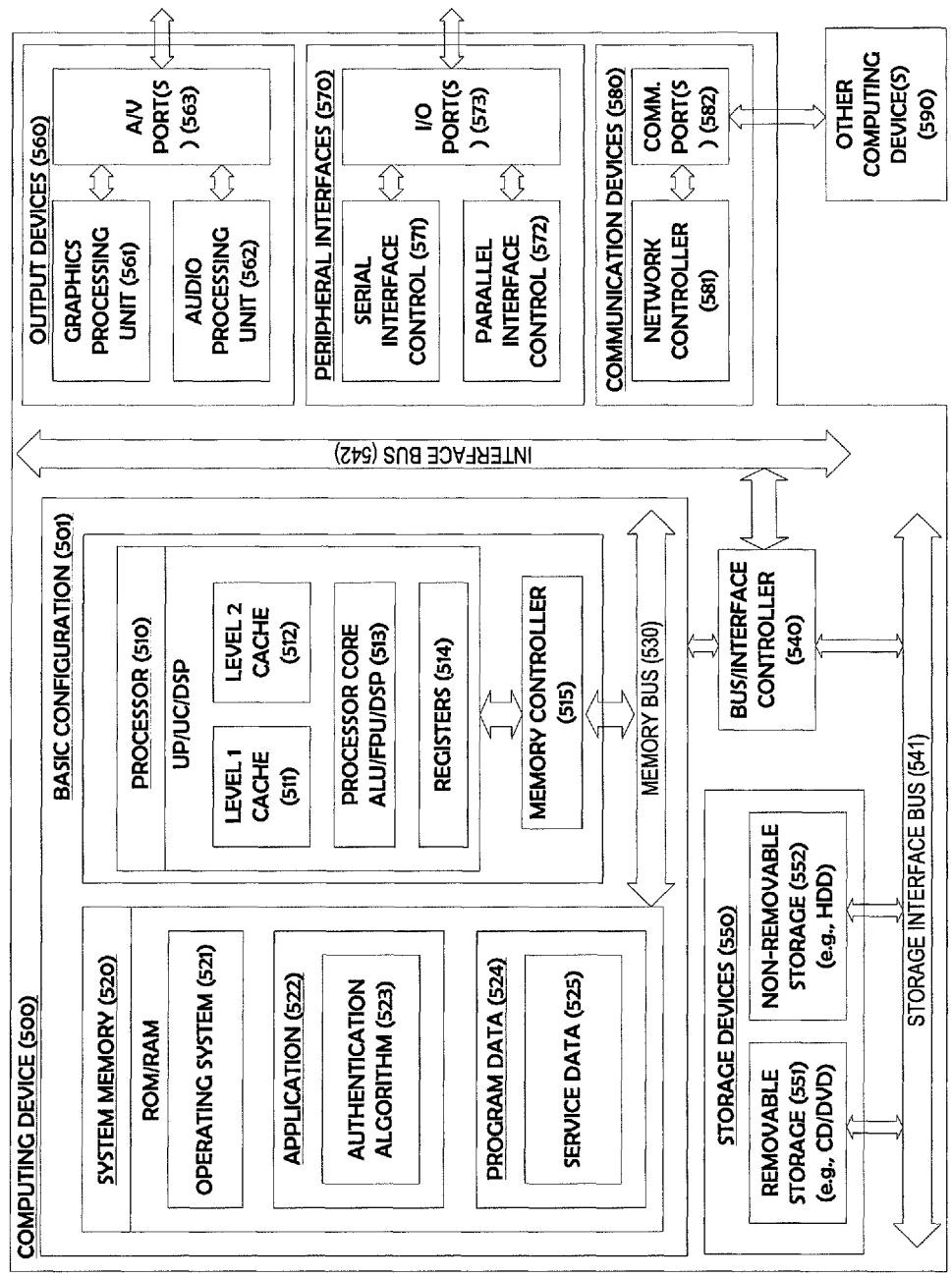
Figure 5 – Computing System

TOOL TO ANALYZE DEPENDENCY INJECTION OBJECT GRAPHS FOR COMMON ERROR PATTERNS

BACKGROUND

Dependency injection (DI) is a design pattern in object-oriented computer programming whose purpose is to reduce the coupling between software components. Frequently an object uses (depends on) work produced by another part of the system. With DI, the object does not need to know in advance about how the other part of the system works. Instead, the programmer provides (injects) the relevant system component in advance.

Instead of hard-coding the dependencies, a component just lists the necessary services and a DI framework supplies these. At runtime, an independent component will load and configure components such as the database driver and offer a standard interface to interact with the database. The details have been moved from the original component to a set of new, small, database-specific components, reducing the complexity of them all. In DI terms, these new components are called "service components", as they render a service (database access) for one or more other components.

One benefit of using the dependency injection approach is the reduction of boilerplate code in the application objects since all work to initialize or set up dependencies is handled by a provider component. Another benefit is that it offers configuration flexibility because alternative implementations of a given service can be used without recompiling code. This is useful in unit testing, as it is easy to inject a fake implementation of a service into the object being tested by changing the configuration file.

However, there should be a definite reason for moving a dependency away from the object that needs it. One drawback is that excessive or inappropriate use of dependency injection can make applications more complicated, harder to understand, and more difficult to modify. Code that uses dependency injection can seem incomprehensible to some developers, since instantiation and initialization of objects is handled completely separately from the code that uses them. This separation can also result in problems that are hard to diagnose.

SUMMARY

Variations of the systems and techniques discussed herein may pertain to a method of identifying errors in an object dependency graph, the method comprising: determining a module and module type associated with a method at a plugin point on the object dependency graph; automatically selecting, from a set of testlets, at least one testlet associated with the determined module type, where each testlet is associated with one or more common dependency errors; and automatically creating, with a processor, at least one test suite for each selected testlet, where automatically creating includes building an executable code module that, when executed with a processor, analyzes the dependency graph at the plugin point and generates data showing a location and severity of common dependency errors within the graph.

Some variations of methods may include a step of building the dependency graph and identifying plugin points prior to said determining. Further variations may include steps of executing the created test suite; and indicating an outcome of the test suite execution. Yet further variations may include a step of receiving the object dependency graph prior to performing determining.

In some variations, the step of automatically selecting may include selecting default testlets generic to multiple application types; and the step of automatically creating may include wrapping the selected testlets in unit test cases, where each test suite includes at least one unit test case. In further variations, the step of executing may include performing an automatic repair of said dependency graph in response to an error detected during test execution.

Some variations may also include a step of performing an automatic repair of said dependency graph in response to an error indicated in the outcome of the test suite execution.

In some variations, the plugin point on the object is a predetermined plugin point specified prior to the step of determining.

Variations of the systems and techniques discussed herein may pertain to an apparatus for analyzing a dependency object graph of one or more software components, the apparatus comprising: an object graph acquisition component that acquires the object graph; a plugin-point location component that locates and sets plug-in points in the object graph; a test suite manager interface portion that provides the object graph and the set plug-in points to a test suite manager portion; and receives unit tests created by the test suite manager portion; and a test result generation portion that generates test results based on unit tests executed by the test suite manager portion.

In some variations, the test suite manager portion executes the unit tests at the direction of the test suite manager interface portion; and the test suite manager portion performs an automatic fix of the object graph in response to an error detected during unit test execution.

Variations of the systems and techniques discussed herein may pertain to a device for analyzing a dependency object graph of one or more software components, the device comprising: a processor; a computer-readable memory having stored thereon a set of instructions which, when executed by the processor, cause the device to perform a method of identifying errors in an object dependency graph, the method comprising: determining a module and module type associated with a method at a plugin point on the object dependency graph; automatically selecting, from a set of testlets, at least one testlet associated with the determined module type, where each testlet is associated with one or more common dependency errors; automatically creating at least one test suite for each selected testlet, where automatically creating includes building an executable code module that, when executed with a processor, analyzes the dependency graph at the plugin point and generates data showing a location and severity of common dependency errors within the graph.

Variations of a method performed by the device may include the method variations discussed herein.

Variations of the devices and methods discussed herein may be represented in whole or in part on one or more non-transitory computer-readable media having embodied thereon a set of instructions which, when read and executed by one or more processors, cause the processors to perform a method of identifying errors in an object dependency graph in a manner consistent with the variations discussed herein.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

FIG. 5 shows an embodiment of a computing system configured to operate part or all of a dependency injection testing system as described herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof While DI frameworks simplify application development, they end up creating a significant new form of complexity in specifying object graphs to satisfy dependencies. Testing the 'wiring' of these object graphs is usually only achievable by running the entire application and in many cases going through large test suites that exercise many aspects of the application. Smaller tests (unit tests, or medium size component tests) bypass the production object graph because they either create the code under test by hand, or use a simplified object graph that only is used in testing. This leaves a significant portion of the application untested until an actual QA (Quality Assurance) cycle. The majority of errors caused by object graph wiring issues tend to fall into certain non-application specific categories. It is therefore desirable to analyze the production object graph of any application and spot common problems before an actual QA cycle.

Figure 3:
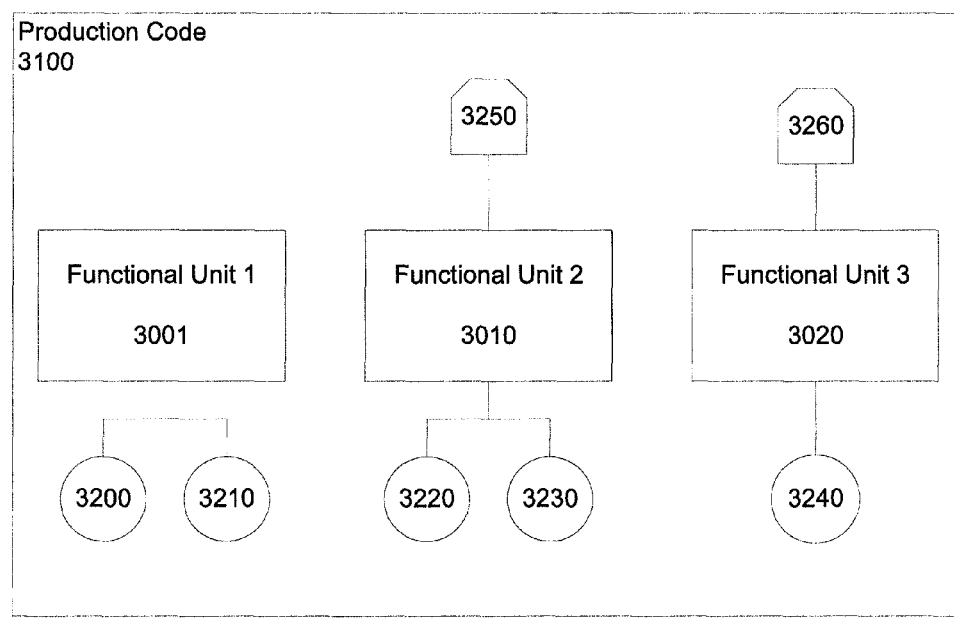
FIG. 3 shows an example of functional and testing code components for use in development and test environments.
Figure 3:
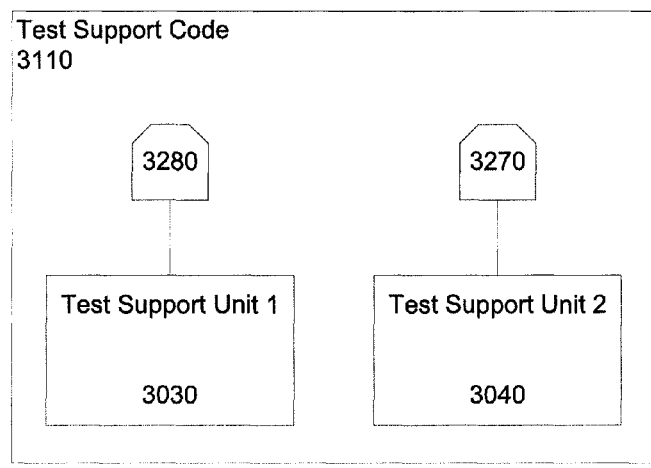

Referring first to FIG. 3, a set of production code objects 3100 may include various functional units 3001, 3010, 3020. In some cases a functional unit may be a top-level functional unit 3001 that has one or more dependencies 3200, 3210 associated therewith. For example, a functional unit 3001 that represents a cash register application may depend on a database 3200 to store sales records and may also depend on a credit card processor 3210 to authorize credit card sales.

Continuing with the cash register example, the credit card processor may be another functional unit 3010 and may also have further dependencies 3220, 3230 for an encryption appliance and a credit card transaction database. The credit card processor may also have a component interface 3250 that enables the credit card processor 3010 to meet the credit card processor dependency 3200 of a cash register 3001 component.

In order to test a functional unit 3001, however, it is often preferable to create a test environment and associated unit tests for the component 3001 in question. Continuing with the credit card example, FIG. 3 also shows test support code objects 3110. These objects may be dependency-free test versions of a credit card processor 3030, having the associate interface 3280 and a database 3040, having its associated interface 3270.

Figure 4:
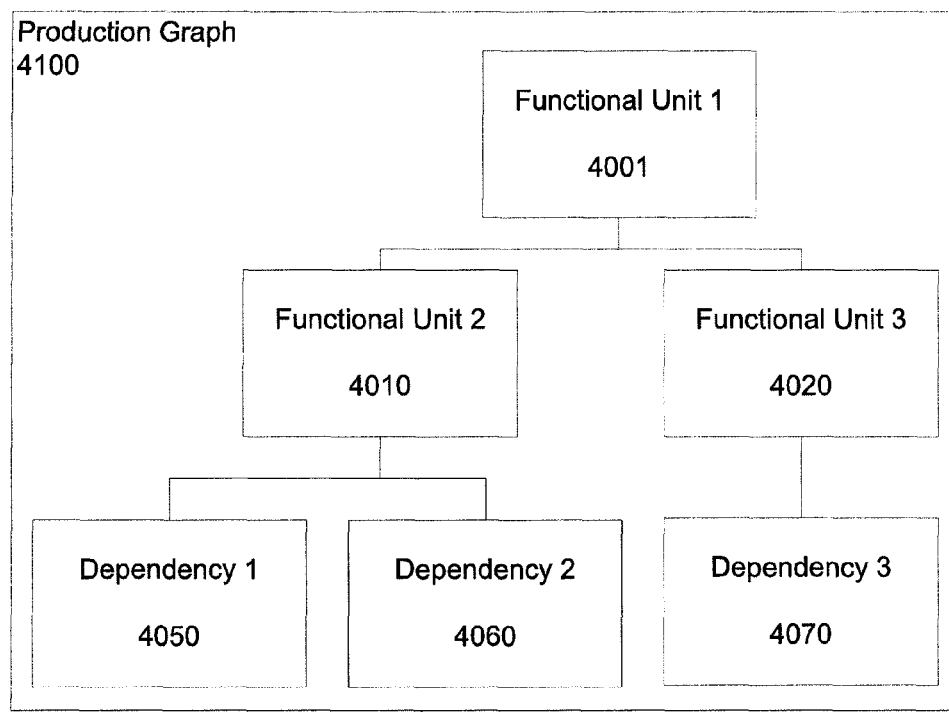
FIG. 4 shows an example of production and test wiring graphs for dependencies between functional code units.
Figure 4:
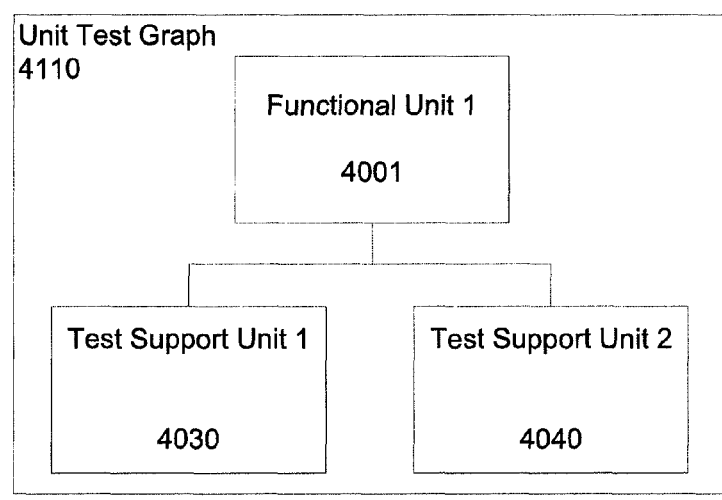

Production and test wiring diagrams for the functional units of FIG. 3 are shown in FIG. 4. The production graph 4100 shows the dependency structure of a production version of a cash register application 4001. The database 4020 and credit card processor 4010 functional units/applications are shown as dependencies of the cash register functional unit 4001, and the credit card processor 4010 and database 4020 have their own dependencies 4050, 4060, 4070 which are required for them to function properly.

Similarly, the database of the cash register may be yet another functional unit 3020 and may also have one or more further dependencies 3240 such as a dependency on a database URL or other indicator of a networked data storage location. The database may also have a component interface 3260 that enables the database 3020 to meet the database dependency 3210 of the cash register component 3001.

The unit test graph 4110 shows a unit test dependency structure for a test version of a cash register application 4001. In the unit test setting, only the dependencies of the cash register application are of interest, and are fulfilled by test support units 4030, 4040.

The test graph 4110 is a different wiring diagram from the production graph 4100 and the behavior of the functional unit 4001 is different as well in the test and production settings. Both, however have dependencies and therefore are suitable for analysis and evaluation by a DI framework analysis tool.

In embodiments of the present invention, a DI framework analysis tool may be used which takes a set of DI framework modules that specify a test or production object graph and runs the injector in a test or offline mode to analyze the object graph. The DI framework analysis tool specifies plugin points, referred to as testlets, which receive an isolated copy of the production graph that they can manipulate and analyze for errors. Many types of wiring errors can be detected without even knowing an application's business logic and functionality.

Such a DI framework analysis tool may be used to create a suite of unit tests that are runnable with a typical test framework. Each testlet may be represented as a separate test case. This allows for quick identification of which parts of an object graph are leading to failure. In some variations, the testlets may be created and executed automatically, in other variations the information may be presented to a user or a downstream system for further analysis and action.

Figure 1:
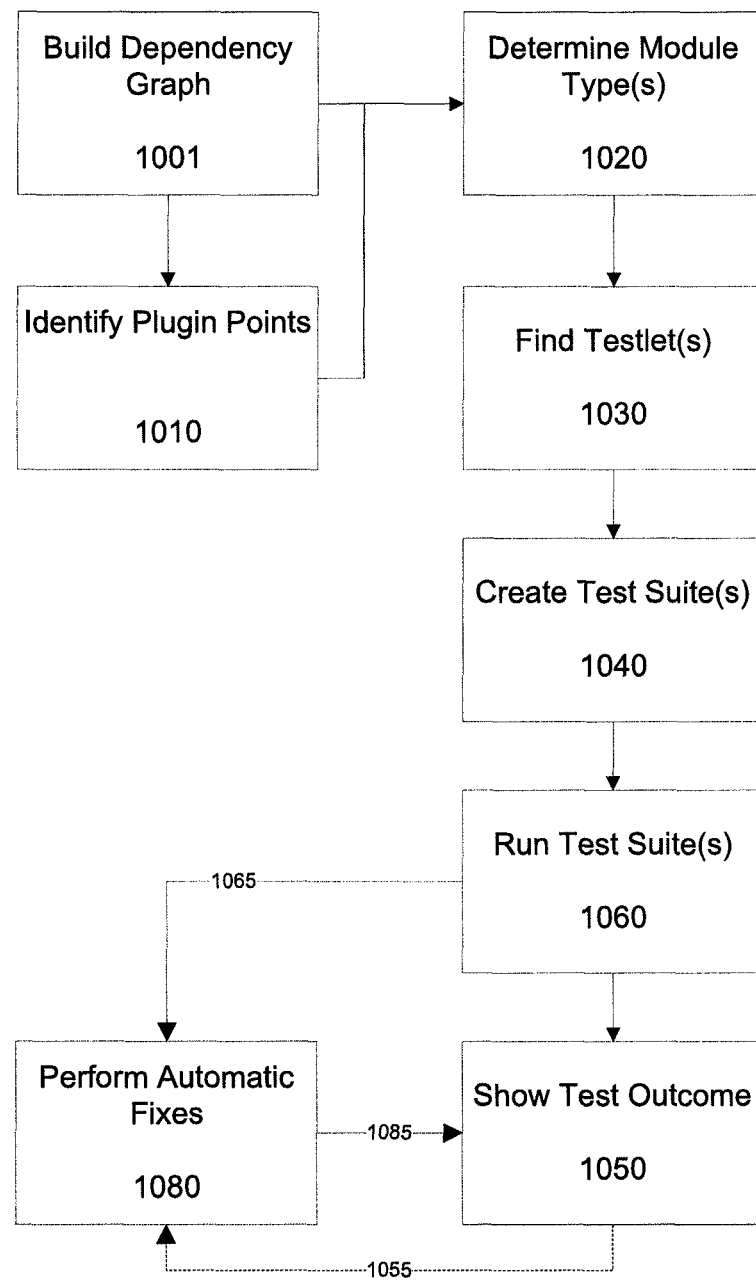
FIG. 1 shows an example interface that may change to a different particular interface for a requested or predicted command.

Such a DI framework analysis tool may be used to create a test suite by specifying, to the DI analysis tool, which method it should call to get a list of modules that the tested application normally would use to create the DI injector. When the test suite is run, any test failures indicate problems with the applications object graph. An embodiment of a DI framework analysis tool workflow may include the steps of passing a set of modules (or DI wiring instructions) to the tool that would be used to run the application in production, specifying some assertions about the application's intended structure, adding default testlets, wrapping testlets in unit test cases, creating an object graph without creating actual software components, executing the test cases, and returning test case execution results. An example of a test suite creation and execution process is depicted in FIG. 1.

A dependency graph for an application may be built 1001 by a DI framework analysis tool. Plugin points may then be identified in the graph 1010 either manually by an application developer or with the DI framework analysis tool. In some variations, the DI framework analysis tool may find the dependencies of each component and also other components that satisfy these dependencies. In some variations, however, the dependency-satisfying components may be explicitly identified to the DI framework analysis tool with a "module," or set of framework wiring instructions, that tells the DI framework analysis tool how to satisfy the dependencies of one or more components.

Once the dependency graph is built 1001 and the plugin points identified 1010, the DI framework analysis tool may determine a module type associated with each plugin point 1020. Module types may be determined automatically or may be provided to the DI framework analysis tool. Known modules and module types may have predetermined dependencies or dependency types whereas other modules may be provided to the DI framework analysis tool from an external information source or otherwise input by a tool user.

Once the module types associated with the plugin points are determined 1020, the DI framework analysis tool may search one or more repositories of testlets to find testlets for the identified module type(s) 1030. Testlets may be found and selected by a developer passing modules normally used to create a dependency injector to the DI framework analysis tool. The DI framework analysis tool may then verify that the object graph is follow-connected (e.g. all the dependencies of every software component are satisfied), check that the modules themselves do not violate the assumptions of the DI framework, properly scope all objects in the graph, verify that proper naming conventions are followed, and add any relevant generic testlets.

In some variations, a developer or some outside data source may provide additional information to the DI framework analysis tool about particular objects or classes that should or should not be bound as singletons (non-threadsafe objects should generally not be singleton scoped), classes that must be explicitly bound in the object graph, and classes that are not explicitly bound in the wiring instructions. In some cases, the DI framework analysis tool may infer proper binding and dependency for classes not explicitly bound in the DI framework (i.e. the wiring instructions).

The test suites based on the testlets are then created 1040 by, for example, wrapping each testlet in a JUnit TestCase and adding it to a JUnit test site to be run. Such test suite creation may be fully automated and may use any test case creation utility, including commercially available solutions and custom-coded applications.

The test suites may then be run 1060 and the test results presented 1050 to a user or an analysis tool for further processing and subsequent action. These test outcomes 1050 may include data showing a location and severity of said common dependency errors within the graph. In some variations certain errors could be automatically fixed 1080 (eg—making sure each node in the object graph is associated with a properly named key). In further variations, automatic error fixing 1080 may be specified to occur automatically 1065 during or after text execution 1060, with test outcomes 1050 indicating or otherwise showing 1085 the automatic fixes 1080. In other variations, a test outcome interface 1050 may include a feature to enable or execute automatic fixes 1055 of certain errors. Such automatic fixes 1080 may then be performed 1055 after generation of test outcomes 1050.

In order to avoid having to create new testlets or test scenarios for each application, general test cases may be added to the DI analysis tool by implementing a testlet interface. This interface takes an injector running in a test or offline mode and allows a tool developer to inspect the injector's bindings. If issues or errors are identified with the injector's object graph, the injector may be modified to provide an indicator, such as by throwing an exception. Such an indicator may then be interpreted as a test failure during test execution.

Figure 2:
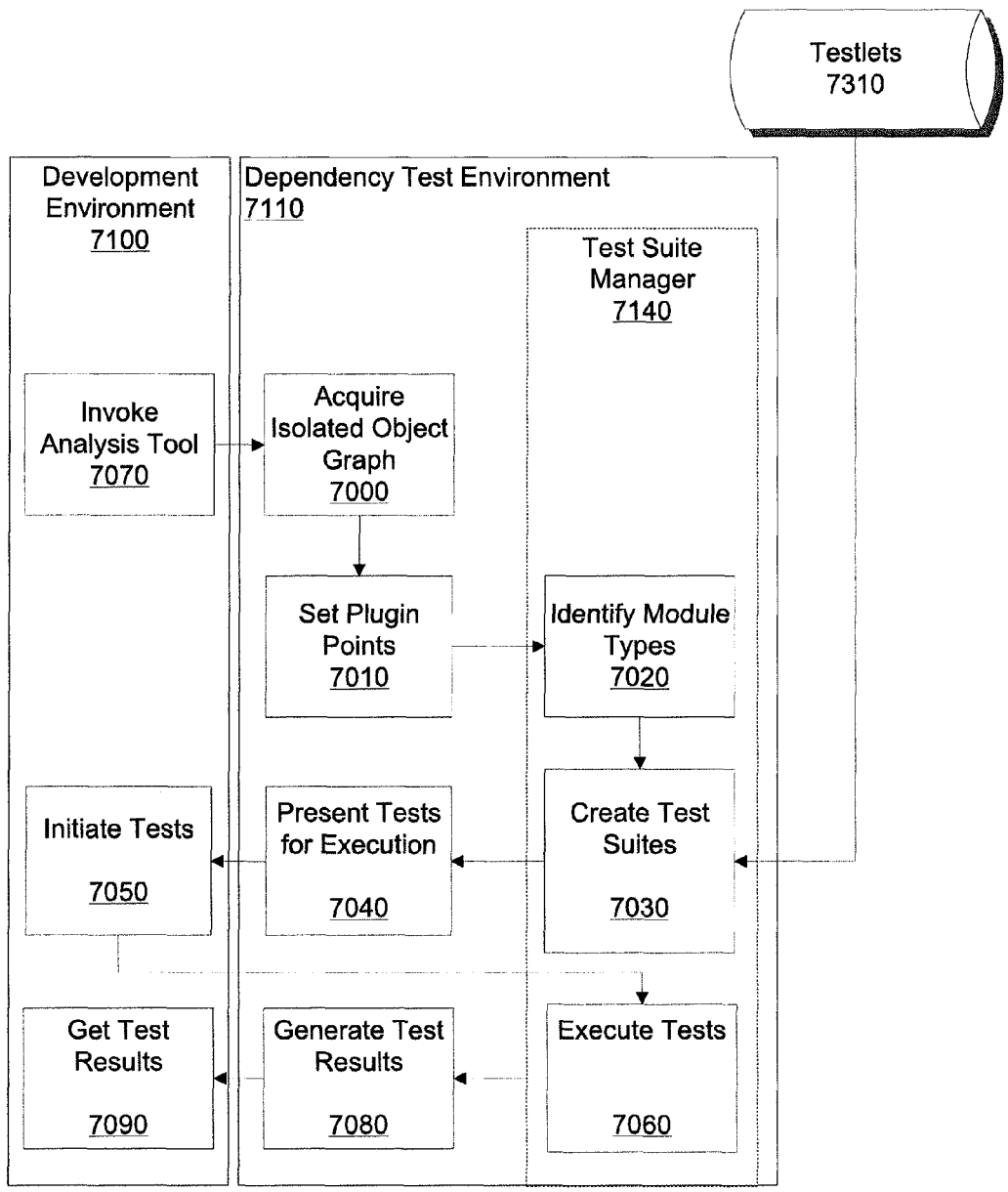
FIG. 2 shows an example communication omnibar with an associated social media account.

In another embodiment of the present invention, a variation of a DI framework analysis tool environment operating in conjunction with a development environment is depicted in FIG. 2. In FIG. 2, a development environment 7100 and a dependency test environment 7110 are depicted. These environments may be on the same or on different computers or computer systems. In some variations, both environments may be distributed such that part of each resides on a server or cloud-based computing platform and part of each resides on a local machine. In some variations, the local part of a development 7100 or dependency test 7110 environment may be a web application that runs on a computing or data access device having a data connection to a networked computing system or set of systems.

In some variations, those aspects of the development environment 7100 needed to interact with the dependency test environment 7110 may be interface features of a local application or application portion on a particular data access or computing device. In other variations, the development environment interface may itself be an online or web-based utility.

The DI framework analysis tool may be invoked 7070 from the development environment in the same way any other unit test may be invoked. This may be governed by the particular development environment, which may be a commercially available solution or a custom-built application or some combination thereof. The DI framework analysis tool then acquires an isolated object graph 7000 of the functional unit (s) being evaluated. Plugin points may then be set for the object graph 7010 within the dependency test environment 7110 as noted above.

A test suite manager portion 7140 of the dependency test environment 7110 may then identify module types 7020 associated with the plugin points 7010 and create test suites 7030 for those module types. The test suites 7030 may be created by comparing the identified module types against a test scenario database 7310 having general test cases and specific testlets.

In some variations, the DI framework analysis tool maintains a reference to the test suite manager portion 7140 which can create the production modules and a list of testlets. In such a variation, the test suite manager aspect may be a separate program or set of programs operating on either the same or different or overlapping devices as compared to the overall dependency test environment toolset 7110.

In some variations, the test suite manager does not know or need to know anything about modules or injection. The DI framework analysis tool may be responsible for gathering all the modules and deciding which tests to execute. Once those decisions are made, the selected tests may be added to the test suite, which is then managed by the test suite manager to make sure all the tests are executed and the results reported.

In one such variations, when the application developer requests the DI framework analysis tool to create the final test suite 7030, the tool iterates through its collection of testlets 7310 and for each one, creates a test case that will call the module creation function to build the set of production modules, pass these modules to the DI framework to create an injector in test or offline mode and then pass the test or offline mode injector to the testlet. This test case is then added to the test suite and returned to the application developer's code to be run.

The end result for the application developer is a single call like this:

```
public class UatFeServerinjectorTest {
    public static TestSuite suite( ) {
        return new InjectorTestSuiteBuilder( )
            .injectorName("UatFeServer")
            .addModuleCallable(new Callable<Module>( ) {
                @Override
                public Module call( ) {
                    return UatFeServer.appModules( );
                }
            })
            .binding(TemplateExecutor.class)
            .binding(BackInfoService.class)
            .binding(UatFeServer.class)
            .build( );
    }
}
```

That ends up creating a test suite with cases for scenarios where: common expensive objects, calls, and services are singleton scoped (e.g. re-using a database connection instead of creating a new database connection instance), remote procedure call (RPC) stubs are bound properly so they do not leak sockets, module creation and object graph configuration does not spawn threads, perform I/O or do other unwanted operations, and basic types are all bound with annotations.

Provided testlets can include: Nice/Strict binding, Scoped binding, Singleton binding, Resource leak detection, Heavyweight type detection, and Unannotated simple type detection. In some variations, as new general testlets are created and the test gets run again, the application developer will automatically have these cases added to his or her test suite.

In other variations, the created test suites 7030 may be presented for execution 7040 within the dependency test environment. The tests may be initiated 7050 from the development environment 7100, which may trigger test execution 7060 to actually take place in the test suite manager portion 7140. Test execution includes running the testlet with the dependency object graph and reporting the results of the testlet as a pass or fail of the test case. The test results are then generated 7080 and presented 7090 in the development environment 7100 for subsequent interpretation and use.

FIG. 5 is a block diagram illustrating an example computing device 500 that is arranged for dependency testing as discussed herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (µP), a microcontroller (µC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a multipath processing algorithm 523 that is arranged to process and operate on one or more requests for dependency testing as discussed herein. Program Data 524 includes multipath routing data 525 that is useful for performing the dependency testing calculations, as will be further described below. In some embodiments, application 522 can be arranged to operate with program data 524 on an operating system 521 such that the overall system performs one or more specific variations of dependency testing techniques as discussed herein. This described basic configuration is illustrated in FIG. 5 by those components within dashed line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims.

What is claimed is:

1. A method of identifying errors in an object dependency graph, the method comprising:
   identifying one or more plugin points associated with the object dependency graph;
   determining a module and module type associated with a method at one of the one or more plugin points on the object dependency graph, where the module type represents a type of service provided by the module when executed;
   responsive to determining the module type, automatically discovering one or more repositories of testlets associated with the determined module type;

automatically selecting, from a set of testlets in the one or more repositories of testlets, at least one testlet associated with the determined module type, where each testlet is associated with one or more common dependency errors and where at least one automatically selected testlet is generic to multiple application types; and automatically creating, with a processor, at least one test suite for each selected testlet, the created at least one test suite including at least one unit test case, where said automatically creating includes building an executable code module that, when executed with a processor, analyzes the object dependency graph starting at the plugin point based on the created at least one test suite, the analyzing including analyzing bindings of a dependency injector associated with the object dependency graph, and generates data showing a location and severity of said common dependency errors within the object dependency graph.

2. The method of claim 1, the method further comprising building the dependency graph and identifying plugin points prior to said determining.

3. The method of claim 1, the method further comprising:
executing the created test suite; and
indicating an outcome of the test suite execution.

4. The method of claim 3, said executing including performing an automatic repair of said dependency graph in response to an error detected during test execution.

5. The method of claim 3, the method further comprising performing an automatic repair of said dependency graph in response to an error indicated in the outcome of the test suite execution.

6. The method of claim 1, the method further comprising receiving the object dependency graph prior to said determining.

7. The method of claim 1, said automatically creating including wrapping the selected testlets in unit test cases, where each test suite includes at least one unit test case.

8. The method of claim 1, where the plugin point on the object is a predetermined plugin point specified prior to said determining.

9. A device for analyzing a dependency object graph of one or more software components, the device comprising:
a processor;
a computer-readable memory having stored thereon a set of instructions which, when executed by the processor, cause the device to perform a method of identifying errors in an object dependency graph, the method comprising:
identifying one or more plugin points associated with the object dependency graph;
determining a module and module type associated with a method at one of the one or more plugin points on the object dependency graph, where the module type represents a type of service provided by the module when executed;
responsive to determining the module type, automatically discovering one or more repositories of testlets associated with the determined module type;
automatically selecting, from a set of testlets in the one or more repositories of testlets, at least one testlet associated with the determined module type, where each testlet is associated with one or more common dependency errors, and where at least one automatically selected testlet is generic to multiple application types; and automatically creating at least one test suite for each selected testlet, the created at least one test suite including at least one unit test case, where said automatically creating includes building an executable code module that, when executed with a processor, analyzes the object dependency graph starting at the plugin point based on the created at least one test suite, the analyzing including analyzing bindings of a dependency injector associated with the object dependency graph, and generates data showing a location and severity of said common dependency errors within the object dependency graph.

10. The device of claim 9, the method further comprising building the dependency graph and identifying plugin points prior to said determining.

11. The device of claim 9, the method further comprising:
executing the created test suite; and
indicating an outcome of the test suite execution.

12. The device of claim 11, said executing including performing an automatic repair of said dependency graph in response to an error detected during test execution.

13. The device of claim 11, the method further comprising performing an automatic repair of said dependency graph in response to an error indicated in the outcome of the test suite execution.

14. The device of claim 9, the method further comprising receiving the object dependency graph prior to said determining.

15. The device of claim 9, said automatically creating including wrapping the selected testlets in unit test cases, where each test suite includes at least one unit test case.

16. The device of claim 9, where the plugin point on the object is a predetermined plugin point specified prior to said determining.

17. A non-transitory computer-readable medium having embodied thereon a set of instructions which, when read and executed by one or more processors, cause the processors to perform a method of identifying errors in an object dependency graph, the method comprising:
identifying one or more plugin points associated with the object dependency graph;
determining a module and module type associated with a method at one of the one or more plugin points on the object dependency graph, where the module type represents a type of service provided by the module when executed;
responsive to determining the module type, automatically discovering one or more repositories of testlets associated with the determined module type;
automatically selecting, from a set of testlets in the one or more repositories of testlets, at least one testlet associated with the determined module type, where each testlet is associated with one or more common dependency errors, and where at least one automatically selected testlet is generic to multiple application types; and automatically creating at least one test suite for each selected testlet, the created at least one test suite including at least one unit test case, where said automatically creating includes building an executable code module that, when executed with a processor, analyzes the object dependency graph starting at the plugin point based on the created at least one test suite, the analyzing including analyzing bindings of a dependency injector associated with the object dependency graph, and generates data showing a location and severity of said common dependency errors within the object dependency graph.

18. The method of claim 1, where each testlet receives an isolated copy of the dependency graph.

* * * * *